United States Patent
Steinmeyer et al.

(10) Patent No.: US 10,668,778 B2
(45) Date of Patent: Jun. 2, 2020

(54) METHOD AND SYSTEM FOR ASCERTAINING A PRESSURE RATIO BETWEEN A SETPOINT TIRE PRESSURE AND AN ACTUAL TIRE PRESSURE FOR TIRE OF A VEHICLE

(71) Applicant: VOLKSWAGEN AG, Wolfsburg (DE)

(72) Inventors: Simon Steinmeyer, Braunschweig (DE); Marc-Michael Meinecke, Sassenburg (DE); Pär Degerman, Oxelösund (SE); Carsten Deeg, Berlin (DE)

(73) Assignee: Volkswagen AG, Wolfsburg (DE)

( * ) Notice: Subject to any disclaimer, the term of this patent is extended or adjusted under 35 U.S.C. 154(b) by 493 days.

(21) Appl. No.: 14/909,332

(22) PCT Filed: Jul. 18, 2014

(86) PCT No.: PCT/EP2014/065476
§ 371 (c)(1),
(2) Date: Feb. 1, 2016

(87) PCT Pub. No.: WO2015/014635
PCT Pub. Date: Feb. 5, 2015

(65) Prior Publication Data
US 2016/0200154 A1   Jul. 14, 2016

(30) Foreign Application Priority Data

Aug. 1, 2013   (DE) .................... 10 2013 108 283

(51) Int. Cl.
B60C 23/04   (2006.01)
B60W 40/13   (2012.01)
(Continued)

(52) U.S. Cl.
CPC ........ *B60C 23/0486* (2013.01); *B60C 23/061* (2013.01); *B60W 40/105* (2013.01); *B60W 40/13* (2013.01)

(58) Field of Classification Search
CPC ............ B60C 23/0408; B60C 23/0486; B60C 23/061; B60W 40/105; B60W 40/13
See application file for complete search history.

(56) References Cited

U.S. PATENT DOCUMENTS 6,946,954 B2   9/2005   Piëch et al.
7,000,462 B2   2/2006   Hillenmayer et al.
(Continued)

FOREIGN PATENT DOCUMENTS

DE   100 60 392   6/2002
DE   102 05 815   8/2003
(Continued)

OTHER PUBLICATIONS

G. Rill, "Fahrzeugdynamik", pp. 1-18, 2001 (excerpt from lecture notes).
(Continued)

*Primary Examiner* — Jill E Culler
*Assistant Examiner* — Leo T Hinze
(74) *Attorney, Agent, or Firm* — Hunton Andrews Kurth LLP

(57) ABSTRACT

A pressure ratio between a setpoint tire pressure and an actual tire pressure for a tire of a vehicle is ascertained by the following steps:
  Ascertaining a wheel load which is acting on the tire.
  Ascertaining a dynamic tire radius of the tire.
  Ascertaining the pressure ratio as a function of the wheel load and the dynamic tire radius.

8 Claims, 3 Drawing Sheets

(51) Int. Cl.
B60W 40/105 (2012.01)
B60C 23/06 (2006.01)

(56) References Cited

U.S. PATENT DOCUMENTS

| | | | | |
|---|---|---|---|---|
| 7,912,604 | B2* | 3/2011 | Oshiro | B60C 23/061 |
| | | | | 701/29.1 |
| 9,358,846 | B2* | 6/2016 | Singh | G01G 19/086 |
| 2003/0121319 | A1 | 7/2003 | Kojima et al. | |
| 2004/0225423 | A1 | 11/2004 | Carlson et al. | |
| 2006/0276984 | A1 | 12/2006 | Kobe et al. | |
| 2007/0034000 | A1 | 2/2007 | Nakao | |
| 2010/0180677 | A1 | 7/2010 | Katou | |
| 2011/0190974 | A1 | 8/2011 | Wada | |
| 2014/0114558 | A1 | 4/2014 | Singh et al. | |
| 2015/0061852 | A1 | 3/2015 | Fu | |
| 2016/0200155 | A1* | 7/2016 | Steinmeyer | B60C 23/061 |
| | | | | 73/146.2 |

FOREIGN PATENT DOCUMENTS

| | | |
|---|---|---|
| DE | 103 52 539 | 6/2005 |
| DE | 102006020490 A1 | 8/2007 |
| DE | 10 2009 057 578 | 6/2011 |
| DE | 10 2009 057 579 | 6/2011 |
| EP | 1 880 874 | 1/2008 |
| EP | 2 722 202 | 4/2014 |
| JP | 2004-317443 A | 11/2004 |
| JP | 2010-076702 | 4/2010 |
| WO | 03/016115 | 2/2003 |
| WO | 2005/097525 | 10/2005 |
| WO | 2005/097525 A1 | 10/2005 |

OTHER PUBLICATIONS

International Search Report, dated Sep. 9, 2014, issued in corresponding International Application No. PCT/EP2014/065476.
International Search Report, dated Sep. 4, 2014, issued in corresponding International Application No. PCT/EP2014/065477.
H. Shraim et al., "Estimation and Analysis of the Tire Pressure Effects on the Comportment of the Vehicle Center of Gravity", Proceedings of the 2006 International Workshop on Variable Structure Systems, IEEE Conference Paper, Jul. 2006, pp. 268-273.

* cited by examiner

METHOD AND SYSTEM FOR ASCERTAINING A PRESSURE RATIO BETWEEN A SETPOINT TIRE PRESSURE AND AN ACTUAL TIRE PRESSURE FOR TIRE OF A VEHICLE

FIELD OF THE INVENTION

The present invention relates to a method and a system for ascertaining a pressure ratio between a setpoint tire pressure, i.e., an optimum tire pressure, and an actual tire pressure for a tire of a vehicle.

BACKGROUND INFORMATION

German Published Patent Application No. 10 2009 057 578 describes checking of a wheel load distribution of a plurality of tires of a vehicle on the basis of the length of a tire contact area and a tire pressure of each tire.

German Published Patent Application No. 10 2009 057 579 describes ascertaining of a setpoint tire pressure based on an actual value and a setpoint value of a tire contact area.

German Published Patent Application No. 103 52 539 describes monitoring of a pneumatic-tired vehicle with the aid of a deformation sensor.

The rolling resistance of a vehicle essentially defines the energy the vehicle requires in order to manage a travel distance. In the case of passenger cars, approximately 20% of the energy must be used to overcome the rolling resistance on expressways. In urban areas this percentage rises to 40%, and in trucks this percentage share is even higher. On expressways, 66% of the energy consumption of trucks is spent on overcoming the rolling resistance. A reduction of the rolling resistance by 3% would therefore reduce the entire energy consumption of trucks on expressways by 2%. A further criterion for optimal tire pressure is the vehicle stability and thus the safety of the driver and the safety of other road users.

SUMMARY

Example embodiments of the present invention provide a reference for a driver of a vehicle by which an optimum tire pressure is able to be adjusted.

According to an example embodiment of the present invention, a method for ascertaining a pressure ratio between a setpoint tire pressure, or optimal tire pressure, and an actual tire pressure for a tire of a vehicle includes the following steps:

- Ascertaining a wheel load, which is acting on the tire predominantly as a result of the vehicle loading.
- Automatically ascertaining a dynamic tire radius of the tire. A dynamic tire radius refers to the particular radius of the tire exhibited by said tire when the vehicle is driving straight ahead. For example, the dynamic tire radius is ascertainable via the rolling circumference of the tire. The rolling circumference corresponds to the distance that the tire covers without slip during one rotation. For example, the rolling circumference can be calculated on the basis of the quotient of the travel distance covered by the vehicle, divided by the number of rotations of the tire.
- Automatically ascertaining the pressure ratio as a function of the wheel load and the dynamic tire radius.

If the ascertained pressure ratio has a value that is greater than 1, the current tire pressure in the affected tire is too low. On the other hand, if the ascertained pressure ratio has a value that is less than 1, the actual tire pressure in the affected tire is too high. The more the value of the ascertained pressure ratio deviates from 1, the more the actual tire pressure in the affected tire deviates from the setpoint tire pressure. In other words, the ascertained pressure ratio provides the driver with an indication of whether the actual tire pressure of the affected tire is too high or too low, and for another, with information about the percentage by which the actual tire pressure deviates from the setpoint tire pressure.

The pressure ratio is ascertained in particular as a function of a constant of the individual tire that defines a setpoint ratio between the dynamic tire radius and an unloaded tire radius. In other words, this tire constant is an application parameter, which is fixedly predefined for each tire (i.e., each tire type) and does not vary across the service life of the tire. The unloaded tire radius defines the radius of the tire in the unloaded state of the tire. For example, the unloaded tire radius can be ascertained when the tire is lying on the floor, so that its tire contact patch does not make contact with the floor.

With knowledge of this tire constant, the pressure ratio can be calculated using the following equation (1):

$$p_{Rel} = (1 - c_{Actual})/(1 - c_{Ideal}) \tag{1}$$

Here, $p_{Rel}$ corresponds to the pressure ratio to be determined, $c_{Actual}$ to a quotient of the dynamic tire radius divided by the unloaded tire radius, and $c_{Ideal}$ corresponds to the predefined tire constant.

The actual tire pressure may be ascertained in addition. For instance, this is possible with the aid of a pressure sensor which is provided inside the tire, but a manual determination of the actual tire pressure is possible, as well. Multiplying the ascertained pressure ratio by the actual tire pressure makes it possible to determine the setpoint tire pressure of the particular tire. Another possibility for ascertaining the actual tire pressure is to estimate the actual tire pressure with the aid of a tire rigidity function, as it will be explained in detail in the following text.

Thus, the driver of the vehicle may be provided with an exact indication of the particular tire pressure that needs to be adjusted in the individual tire, in the form of the setpoint tire pressure.

For example, the dynamic tire radius may be ascertained by determining the distance the vehicle has driven on the basis of GPS data, whereupon this traveled distance is divided by the number of rotations of the particular tire that were detected while the individual tire covered this distance. The number of rotations of the individual tire, for instance, can be determined on the basis of so-called "wheel ticks", 100 wheel ticks per tire rotation being recorded, for example. One wheel tick corresponds to a measuring signal which is detected by a sensor when the tire is rotated about a predefined angle of rotation.

As described previously in the definition of the dynamic tire ratio, the dynamic tire radius can be accurately ascertained only when the tire does not exhibit slip. Dynamic driving situations of the vehicle (e.g., hard braking of the vehicle, an acceleration with spinning tires) should therefore be factored out when determining the dynamic tire radius. Such dynamic driving situations, for example, can be detected with the aid of acceleration sensors or by analyzing brake signals, ABS signals or ESP signals, so that the dynamic tire radius is ascertained only in driving situations in which the tire does not exhibit slippage. In addition, a Kalman filter may be used for comparing the wheel ticks recorded across a predefined interval with expected wheel ticks, so that outliers can be detected and disregarded when ascertaining the dynamic tire radius.

In addition, the dynamic tire radius of the tire of the vehicle is ascertainable as a function of a yaw rate $\Psi$ of the vehicle, a rate of rotation $DG_1$ of the tire, a further rate of rotation $DG_2$ of a further tire of the vehicle, and a distance s between the tire and the further tire, using the following equation (2), as described in the German Published Patent Application No. 10 2006 020 490.

$$r_{dyn} = \frac{1}{2\pi} \times \frac{\Psi \times s}{DG_2 \times X_1 - DG_1} \qquad (2)$$

Here, $X_1$ indicates a circumference ratio, which is able to be calculated in straight-ahead driving of the vehicle from a time integral of the first rate of rotation and a time integral of the second rate of rotation with the aid of the following equation (3):

$$X_1 = \frac{\int DG_1}{\int DG_2} \qquad (3)$$

A tire rigidity can be ascertained as well. If the tire rigidity is known, i.e., a ratio between a difference or a distance between the unloaded tire radius and the dynamic tire radius and the wheel load for the individual tire, the difference is able to be ascertained via the wheel load. This makes it possible to calculate the unloaded tire radius from the sum of the dynamic tire radius and this difference.

The ascertainment of the tire rigidity thus offers an opportunity for determining the unloaded tire radius at all times (i.e., without a direct measurement of the unloaded tire radius). Such a determination of the unloaded tire radius is usually more accurate than, for example, an estimated value or measured value for the unloaded tire radius, which is ascertained by measurements on the stationary vehicle.

Pressure ratio $p_{rel}$ or setpoint tire pressure $p_{Ideal}$ may be ascertained for the actual wheel load for each tire of the vehicle and may be compared to the actual tire pressure of the particular tire. For example, these two values (i.e., the setpoint tire pressure and the actual tire pressure) can be transmitted to the driver of the vehicle via a corresponding interface. As motivation for the driver for adapting the actual tire pressure to the setpoint tire pressure, the additional energy consumption resulting from the incorrectly set tire pressure is able to be displayed in addition. (e.g., "2% (0.41/100 km) higher energy consumption as a result of insufficient tire pressure."). Moreover, when a certain energy consumption threshold value is exceeded, a warning can be generated for the driver in order to alert the driver to the incorrectly adjusted tire pressure. In addition, the driver may be warned of a safety risk caused by an incorrect tire pressure. It is also possible to modify the tire pressure of the individual tire automatically such that it corresponds to the setpoint tire pressure.

To avoid an adaptation of the tire pressure to the setpoint tire pressure in response to every change in the wheel load, an average, maximum or typical wheel load for the individual tire is able to be ascertained. In this case, pressure ratio $p_{rel}$ or the setpoint tire pressure $p_{Ideal}$ may be ascertained as a function of this wheel load (rather than the individual actual wheel load).

There are several options for ascertaining the tire rigidity. For example, a tire rigidity function can be predefined, by which the tire rigidity is ascertained as a function of the actual tire pressure, the velocity of the vehicle, and the wheel load.

If the previously described tire rigidity function is not known to the vehicle, the tire rigidity function is able to be predefined in a rudimentary manner, as indicated in the following equation (4), for example.

$$m = \frac{a}{f} \times \left(\frac{f}{p+k}\right)^n - b \times v \qquad (4)$$

Here, m corresponds to the tire rigidity, f to the wheel load, and v to the velocity of the vehicle. a, b, k, and n are constants. Since constant b is usually very low, tire rigidity 25 000m may also be determined without the term "b*v".

In this case, the constants are learned or determined based on measured values, which are ascertained for multiple instants for the wheel load, the actual tire pressure, and the velocity of the vehicle, such that the square norm of an estimation error is minimized. To do so, for example, a Kalman filter (or some other suitable filter) monitors the correlation between the measured values across a longer period of time. The constants or parameters for the predefined tire rigidity function are thereby determined, which is also referred to as parameter identification. It is possible to consider the wheel load or the actual tire pressure quasi as constants or parameters, so that the measured values measured across the longer period of time may be utilized not only for ascertaining the constants (e.g., a, b, k and n) but also for ascertaining the wheel load or the actual tire pressure, without, for instance, the need to explicitly record the tire pressure with the aid of a pressure sensor. In other words, the method first learns the constants of the tire rigidity function before the tire rigidity function can be used, especially for the purpose of calculating the tire rigidity. In case of a Kalman filter, the constants or parameters of the tire rigidity function to be determined form what is referred to as the Kalman system state vector. This vector is estimated recursively by incorporating the measured value with the time.

It is also possible to ascertain the tire rigidity as a function of a tire type of the tire, that is to say, without recording measured values.

In this alternative, a database for different tire types may be available, for example, where the corresponding tire rigidity is indicated for each tire type for certain tire pressures and for certain speeds of the vehicle. By manual stipulation of the tire type, for example, it is possible to ascertain the effective tire rigidity for the individual tire as a function of the actual tire pressure, which is measured during standstill, for instance.

A system for ascertaining a pressure ratio between a setpoint tire pressure and an actual tire pressure for a tire of a vehicle is also described. The system, which includes a control, is adapted for ascertaining the wheel load and the dynamic tire radius of the individual tire. Depending on the wheel load and the dynamic tire radius, the system ascertains the pressure ratio with the aid of the control.

The advantages of the system substantially correspond to the advantages of the method explained in more detail above, so that they will not be repeated here.

The system may be adapted for executing each variant of the method.

Furthermore, a vehicle may be provided, which includes the described system.

The system and method described herein are suitable for motor vehicles, in particular trucks, but are not restricted to this preferred application field, since it is also usable for airplanes as well as vehicles that are track-guided.

Further features and aspects of example embodiments of the present invention are described in more detail below with reference to the figures.

BRIEF DESCRIPTION OF THE DRAWINGS

Using FIG. 1, the terms static, dynamic and unloaded tire radius are explained.

DETAILED DESCRIPTION

Figure 1:
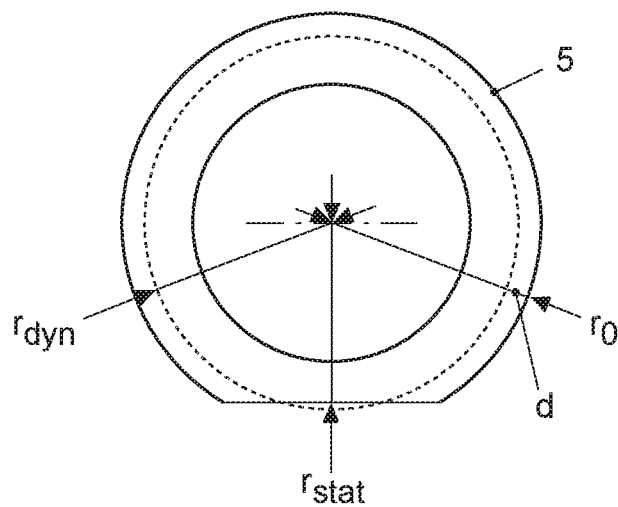

FIG. 1 shows a tire 5, which has a static tire radius $r_{stat}$, a dynamic tire radius $r_{dyn}$ and an unloaded tire radius $r_0$. Static tire pressure $r_{stat}$ defines the shortest distance between center axis 6 of tire 5 and the road on which the vehicle is standing. Dynamic tire radius $r_{dyn}$ is able to be calculated on the basis of the rolling circumference of the tire. Unloaded tire radius $r_0$ is the largest radius measurable on tire 5 and corresponds to the particular tire radius that tire 5 assumes in the unloaded state (i.e., no wheel load is acting on the tire). In summary, the following in equation (5) applies:

$$r_{stat} < r_{dyn} < r_0 \quad (5)$$

Reference symbol d denotes the difference or the distance between unloaded tire radius $r_0$ and dynamic tire radius $r_{dyn}$.

Figure 2:
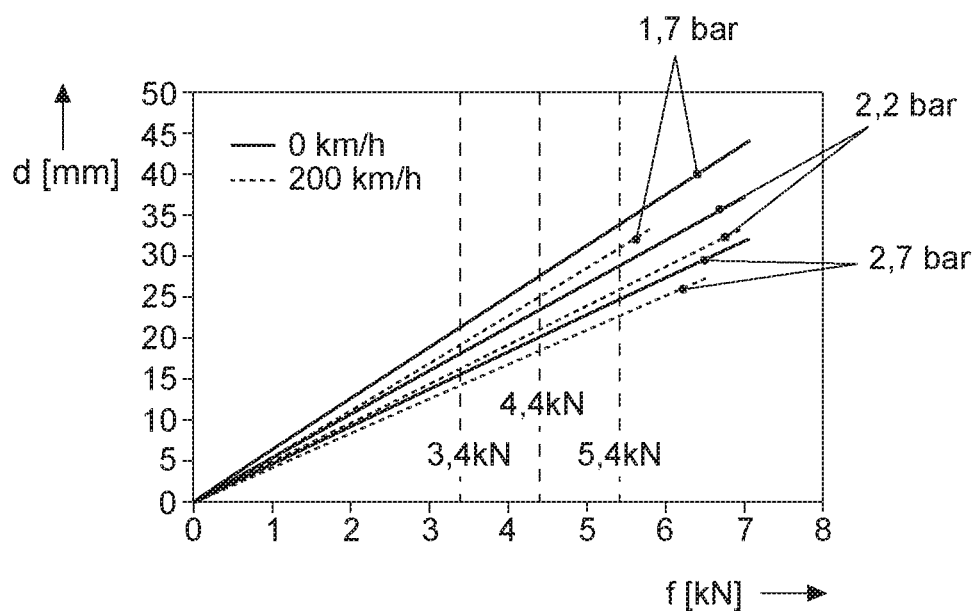
FIG. 2 illustrates examples of the tire rigidity (ratio between the difference between dynamic and unloaded tire radius and the wheel load).

In FIG. 2, the approximately linear relation or ratio m between difference d and wheel load f acting on individual wheel 5 is shown for a particular tire or tire type. Ratio m or the relation between d and f depends on the actual tire pressure and on the speed at which the vehicle is driving. FIG. 2 shows ratio m for pressures 1.7 bar, 2.2 bar and 2.7 bar and for a speed of 0 km/h (i.e., for standstill), and for a speed of 200 km/h.

Figure 3:
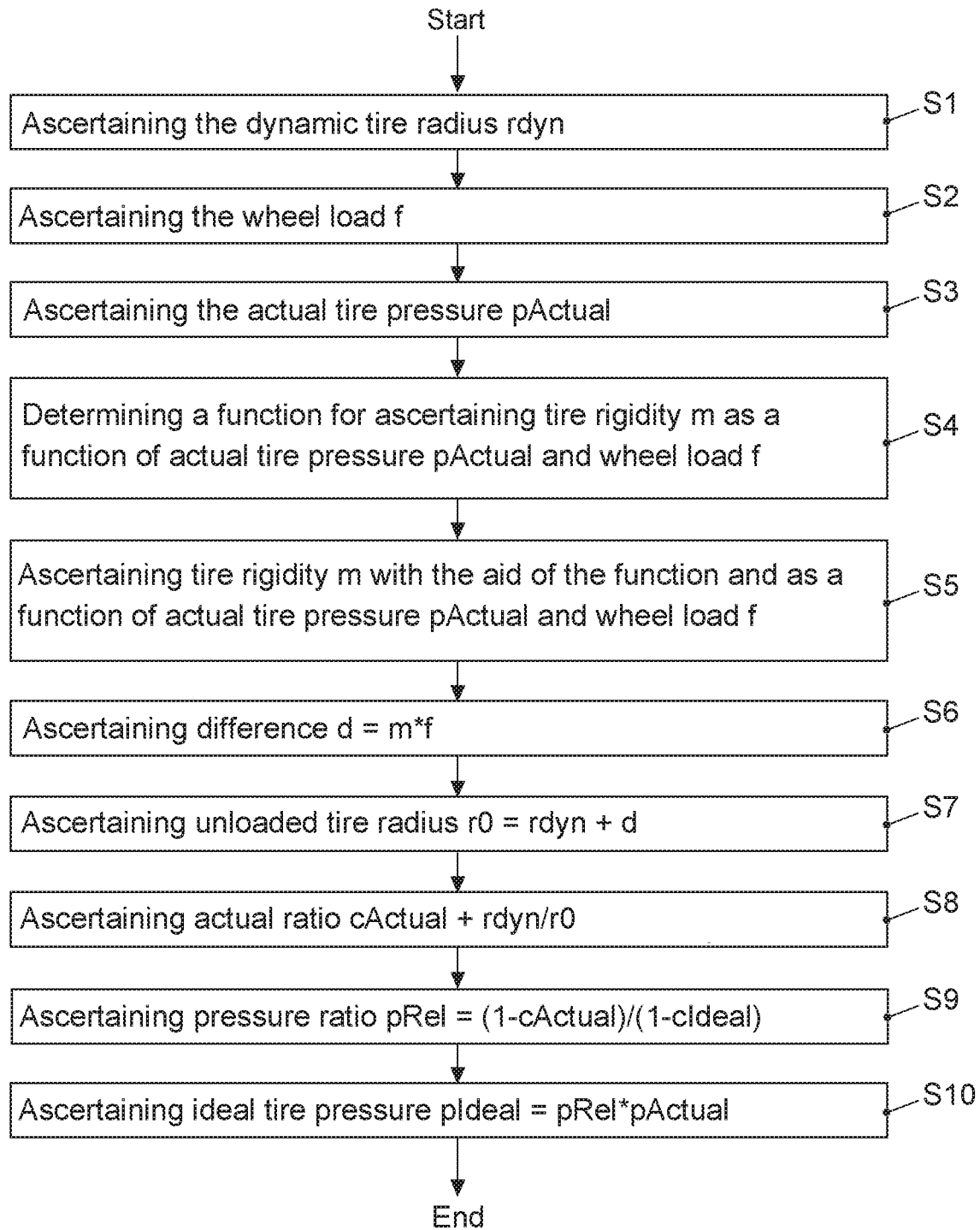
FIG. 3 illustrates the flow chart of a method according to an example embodiment of the present invention for ascertaining the pressure ratio between setpoint tire pressure and an actual tire pressure.

FIG. 3 shows a flow chart of a method according to an example embodiment of the present invention for ascertaining pressure ratio $p_{Rel}$ and for ascertaining ideal tire pressure $p_{Ideal}$.

In first step S1, dynamic tire radius $r_{dyn}$ is ascertained. In general, it holds true that the lower the tire pressure and the higher the wheel load, the more the individual tire will be deformed in the region in which the tire contacts the road (i.e., the greater the difference between dynamic tire radius $r_{dyn}$ and unloaded tire radius $r_0$, and thus difference d).

In second step S2, wheel load f acting on the individual tire is ascertained. Wheel load f may be recorded by corresponding sensors, which in case of an air suspension, for instance, measure the air pressure within the corresponding suspension element. In a conventional suspension system of the vehicle, wheel load f can be detected based on the deflection of the corresponding suspension element.

If no corresponding sensors are available, wheel load f acting on the individual tire is able to be input manually by the driver of the vehicle, for instance. Simplifications are possible, for example in that only one load per axle of the vehicle is predefined and a symmetrical load distribution is assumed, so that the predefined axle load is acting on the individual tire by half a share.

In third step S3, the actual tire pressure of the individual tire is detected by pressure sensors installed inside the tire, for example. This step S3 is optional and required in particular when an absolute value is to be calculated for the setpoint tire pressure. Even without this step S3, the method still allows a relative tire pressure $p_{rel}$ to be determined. Relative tire pressure $p_{rel}$ supplies information, for instance that the tire pressure of the affected tire is too high or too low by 10%.

In fourth step S4, a tire rigidity function is ascertained, by which tire rigidity m (ratio of the difference between dynamic tire radius $r_{dyn}$ and unloaded tire ratio $r_0$ and wheel load f acting on the particular tire) is able to be ascertained as a function of the wheel load, the tire pressure and the speed of the vehicle.

To do so, measured values are recorded or ascertained for the wheel load and the speed for each tire of the vehicle across a certain period of time. If the actual tire pressure is available as well, corresponding measured values are recorded in addition.

For example, using a Kalman filter (or a similar approach), the constants or parameters of a function m=func (f, p, v) are able to be ascertained in advance using the previously recorded measured values. The parameters estimated with the aid of the Kalman filter, for instance, describe certain characteristics of the individual tire or tire type and define the tire rigidity function, so that ratio m is able to be ascertained for the variables of wheel load f, tire pressure p, and velocity v.

As an alternative, the function may also be provided in the form of a database, in which the previously described function with the aid of which the tire rigidity is able to be calculated as a function of the wheel load, the tire pressure and the vehicle velocity, is stored for the various types of tires. Furthermore, there is the option of storing the data that describes the tire rigidity function on an RFID tag directly in or on the tire, for example, and of reading out these data in a contactless manner.

As soon as this function is known or has been determined, tire rigidity m is able to be ascertained in following step S5 as a function of wheel load f and tire pressure $p_{Actual}$ with the aid of the tire rigidity function. In following step S6, difference d results from the product of tire rigidity function m and wheel load f. Difference d may be used in following step S7 for calculating unloaded tire radius $r_0$ by adding dynamic tire radius $r_{dyn}$ and difference d.

Since dynamic tire radius $r_{dyn}$ and unloaded tire radius $r_0$ are now known, ratio $c_{Actual}$ can then be ascertained in following step S8. Given knowledge of setpoint ratio $c_{Ideal}$, this ratio may be used in step S9 for ascertaining relative pressure ratio $p_{Rel}$, so that ideal tire pressure $p_{Ideal}$ is able to be calculated in step S10 with the aid of the product of relative pressure ratio $p_{Rel}$ and actual tire pressure $p_{Actual}$.

Figure 4:
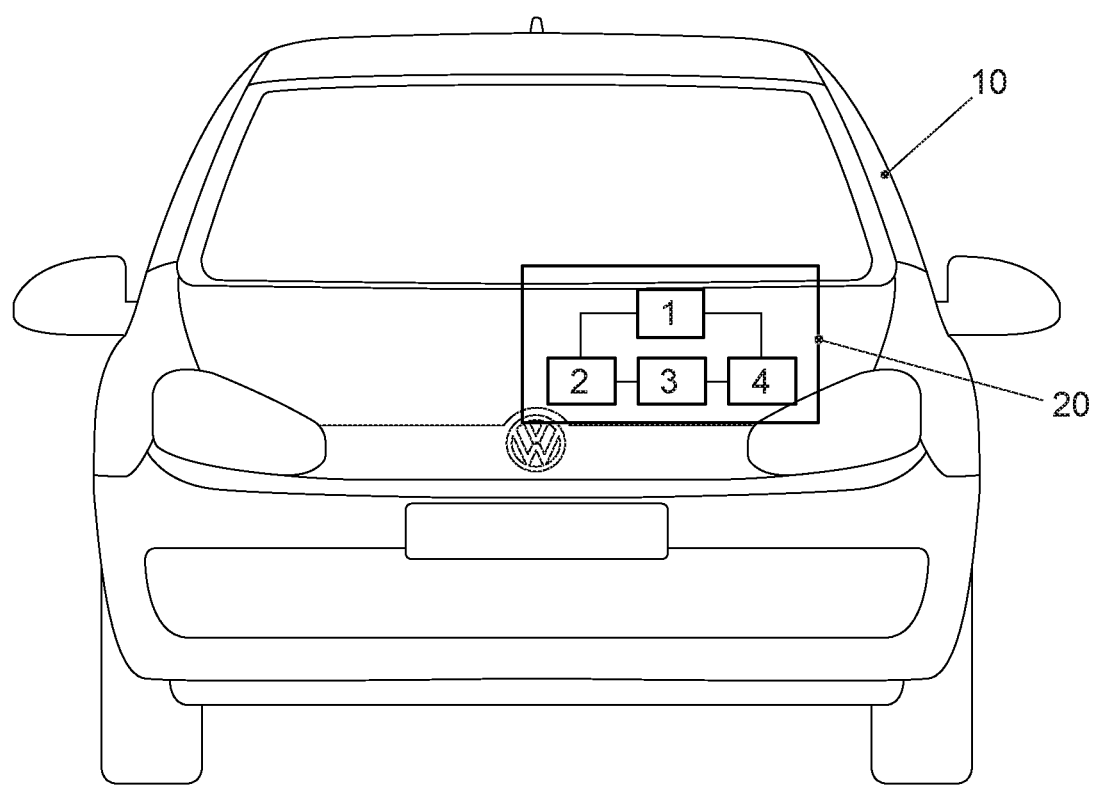
FIG. 4 schematically shows a vehicle having a system according to an example embodiment of the present invention.

FIG. 4 schematically shows a vehicle having a system 20 according to an example embodiment of the present invention. The system 20 includes a control 1, a tire pressure sensor 2, a force sensor 3, and a velocity sensor 4.

LIST OF REFERENCE CHARACTERS 1 control
2 tire pressure sensor 3 force sensor
4 velocity sensor
5 tire
6 tire center axis
10 vehicle
20 system
$c_{Actual}$ ratio between dynamic tire radius and unloaded tire radius
$c_{Ideal}$ optimal ratio between dynamic tire radius and unloaded tire radius
d difference $(r_0-r_{dyn})$
f wheel load
m tire rigidity
$p_{Actual}$ actual tire pressure
$p_{Ideal}$ setpoint tire pressure
$p_{Rel}$ pressure ratio
$r_0$ tire radius in the unloaded state
$r_{dyn}$ dynamic tire radius
$r_{stat}$ static tire radius
$S_1$-$S_{10}$ method step

The invention claimed is:

1. A method for indicating a vehicle tire pressure, the vehicle including a control device, a force sensor, a wheel sensor, a velocity sensor, and a display mounted in the vehicle, the method comprising:
   measuring, by the force sensor, a wheel load acting on the tire based on a deflection of a suspension element;
   measuring, by the wheel sensor, a number of rotations of the tire, and ascertaining, by the control device, a dynamic tire radius of the tire based on the number of rotations and a distance traveled by the vehicle;
   measuring, by the velocity sensor, a velocity of the vehicle;
   ascertaining by the control device, a tire rigidity based on a predefined tire rigidity function using the velocity of the vehicle and the wheel load;
   ascertaining by the control device, a pressure ratio between a setpoint tire pressure and an actual tire pressure for the vehicle, as a function of the tire rigidity, the wheel load and the dynamic tire radius, and;
   displaying, on the display, the pressure ratio.

2. The method according to claim 1, wherein the pressure ratio is ascertained, by the control device, as a function of a constant of the tire, which indicates a setpoint ratio between the dynamic tire radius and an unloaded tire radius.

3. The method according to claim 2, wherein:
   the pressure ratio is calculated, by the control device, in accordance with the following equation:

$$p_{Rel}=(1-c_{Actual})(1-c_{Ideal}),$$

$p_{Rel}$ being the pressure ratio, $c_{Actual}$ being a ratio between the dynamic tire radius and the unloaded tire radius, and $c_{Ideal}$ being the constant of the tire.

4. The method according to claim 1, further comprising:
   ascertaining, by a pressure sensor, an actual tire pressure of the tire; and
   ascertaining, by the control device, a setpoint tire pressure of the tire, by multiplying the pressure ratio by the actual tire pressure.

5. The method according to claim 1, further comprising:
   ascertaining a tire rigidity;
   ascertaining a difference between an unloaded tire radius of the tire in an unloaded state and the dynamic tire radius as a function of the wheel load and the tire rigidity; and
   ascertaining the unloaded tire radius from a sum of the dynamic tire radius and the difference.

6. The method according to claim 5, further comprising:
   predefining a tire rigidity function;
   detecting, by a pressure sensor, a tire pressure of the tire;
   ascertaining, by a velocity sensor, a velocity of the vehicle; and
   ascertaining, by the control device, the tire rigidity based on the tire rigidity function as a function of the tire pressure, the velocity, and the wheel load.

7. The method according to claim 5, further comprising:
   acquisition, by the control device, of measured values of an actual wheel load, by the force sensor, and an actual velocity of the vehicle, by a velocity sensor, at different points in time,
   ascertaining a tire rigidity function, by the control device, which indicates the tire rigidity as a function of speed, the wheel load, and the tire pressure, based on the measured values recorded at different instants; and
   ascertaining the tire rigidity, by the control device, as a function of the tire rigidity function.

8. A system for indicating a vehicle tire pressure, comprising:
   a force sensor adapted to measure a wheel load acting on the tire based on a deflection of a suspension element;
   a wheel sensor adapted to measure a number of rotations of the tire;
   a velocity sensor adapted to measure a velocity of the vehicle; and a control device adapted to:
   ascertain a dynamic tire radius of the tire based on the number of rotations of the tire the distance traveled by the vehicle;
   ascertain a tire rigidity based on a predefined tire rigidity function using the velocity of the vehicle and the wheel load; and
   ascertain a pressure ratio between a setpoint tire pressure and an actual tire pressure for the vehicle, as a function of the tire rigidity, the wheel load and the dynamic tire radius; and
   a display, adapted to display the pressure ratio.

* * * * *